Sept. 23, 1941.   A. BOUWERS   2,256,859
VOLTAGE CONVERTER
Filed May 26, 1939   2 Sheets-Sheet 2
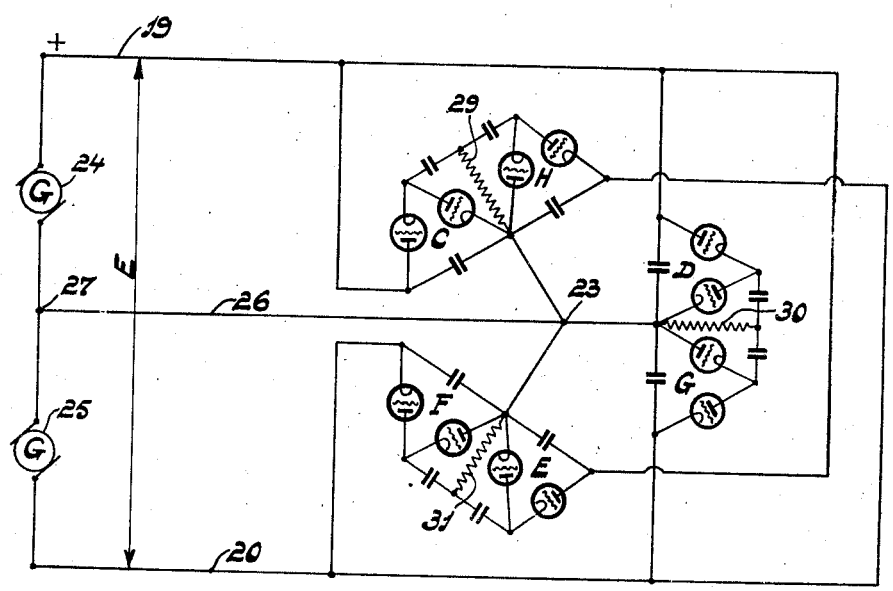
Fig. 3
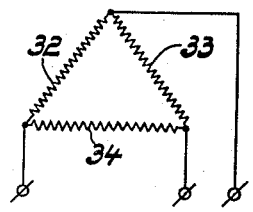
INVENTOR
A. Bouwers
BY
ATTORNEY Patented Sept. 23, 1941

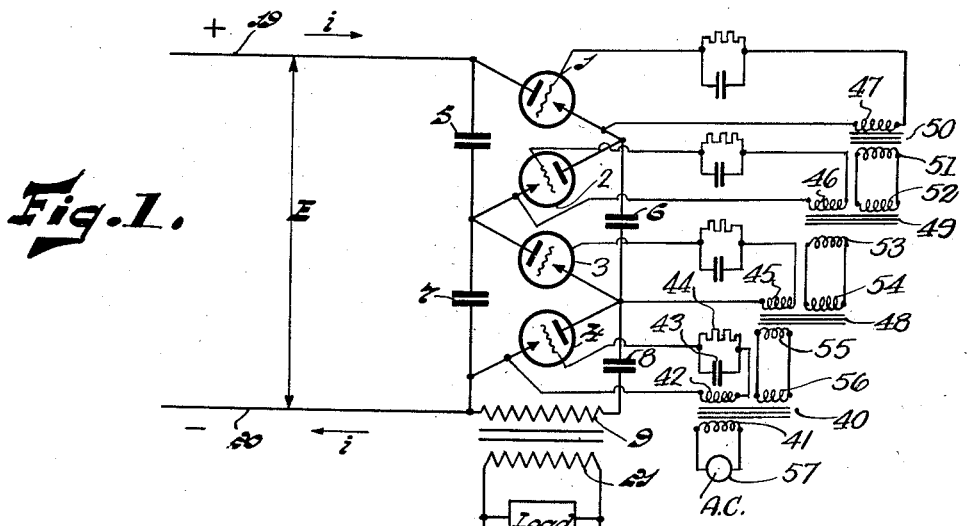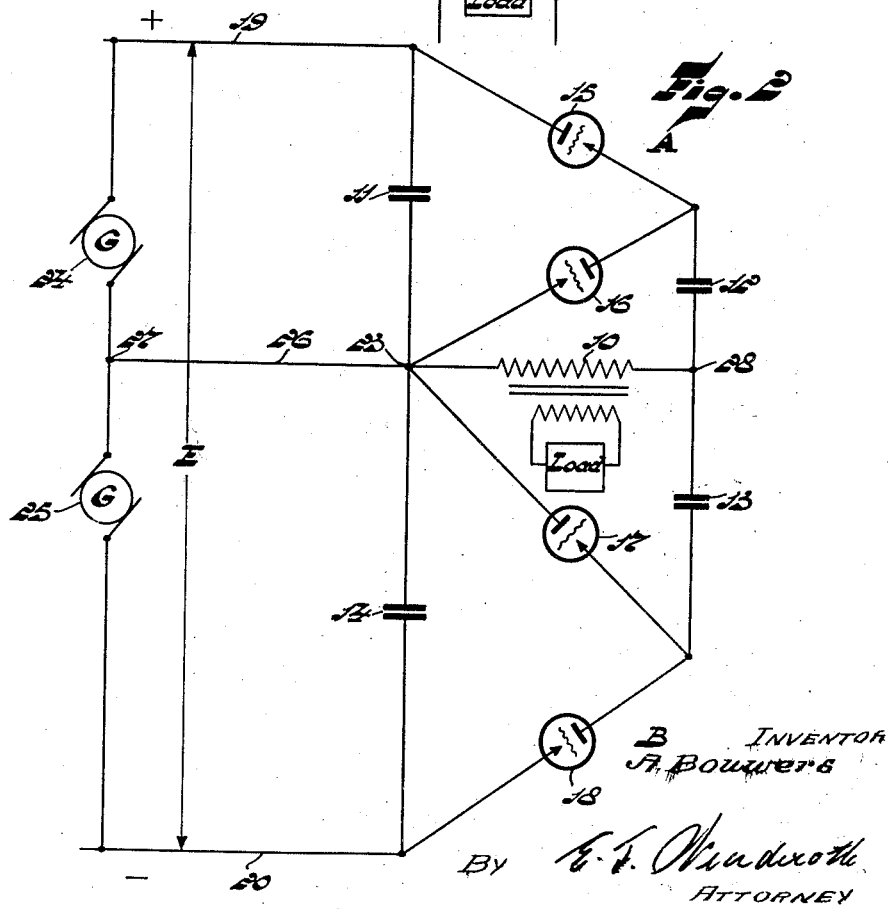

2,256,859

UNITED STATES PATENT OFFICE 2,256,859

VOLTAGE CONVERTER

Albert Bouwers, Eindhoven, Netherlands, assignor, by mesne assignments, to Hartford National Bank and Trust Company, Hartford, Conn., as trustee Application May 26, 1939, Serial No. 276,013
In Germany May 31, 1938

5 Claims. (Cl. 175—363)

The present invention, which is a continuation-in-part of my copending U. S. patent application Ser. No. 245,514 filed December 13, 1938, now Patent No. 2,219,292, relates to a device for converting a direct voltage into an alternating voltage of lower value.

In transmitting electric energy over long distances it is desirable to use direct current of a high voltage, for instance 500,000 volts, because the transmission losses are lower than when A. C. is transmitted. At the load, the D. C. must be converted into A. C. of the desired value and in my above-mentioned application I have described a converter for this purpose. More particularly, I have proposed to connect between the terminals of the direct-voltage supply, a plurality of series-connected controlled discharge paths, preferably grid-controlled gaseous discharge tubes, and to shunt each two successive discharge paths by a condenser. The direct-voltage supply has one terminal directly connected to one end of this series connection and its other terminal connected to a "load resistance" which is connected in series with a condenser across the discharge path at the other end of the series connection. Furthermore, I control the discharge paths so that only all the odd paths or all the even paths are conductive at the same time.

The main object of the present invention is to increase the amount of power which can be transmitted with such converters while using the same parts, except for the "load resistance."

In accordance with the present invention I use two circuit arrangements of the above type and a common "load resistance." The "load resistance" has a point connected to a conductor, which is preferably grounded, and which is connected to a suitably chosen point of the direct voltage supply source, said point having a potential between the potentials of the supply conductors. Said "load resistance" has one end constructed to one end of each of the series connections of the two circuit arrangements. The free ends of the series connections are each connected to one of the D. C. supply conductors.

In order that the invention may be clearly understood and readily carried into effect, I shall describe the same in more detail in comparison with the prior art and with reference to the accompanying drawings in which:

Figure 1 is a schematic diagram of a converter according to my above-mentioned application, and Figure 2 is a schematic diagram of a converter according to the present invention.

In the prior art arrangement illustrated in Figure 1, the reference numerals 19 and 20 designate supply lines between which a direct voltage E is applied. Connected in series and in like manner between lines 19 and 20 are four discharge tubes 1, 2, 3 and 4, shown as gaseous discharge tubes having control grids. Condensers 5, 6 and 7 are connected across tubes 1—2, 2—3 and 3—4 respectively. Connected across discharge tube 4 is a series connection of a condenser 8 and a "load resistance" 9, shown as the primary winding of a transformer having a secondary winding 21 across which a load is connected. However, the term "load resistance" as used herein and in the claims is to be understood to mean an impedance from which the load voltage is obtained and may comprise a resistance or a coil.

The tubes 1 to 4 are controlled in such a manner that the discharge paths of the odd-numbered tubes 1 and 3 are conductive when the discharge paths of the even-numbered tubes 2 and 4 are conductive, and vice versa. As a result, condensers 5 to 8 are alternately charged and discharged and there is produced across the "load resistance" 9, an alternating voltage whose value depends upon the number of stages used. A suitable means for controlling the conductivity of the discharge paths of the tubes is shown and comprises a grid transformer 40 having a primary winding 41 connected to a suitable source of alternating current 57 and a secondary winding 42 having one end connected to cathode of tube 4 and its other end connected through the parallel connection of a grid condenser 43 and a leak resistance 44 to the grid of tube 4. Tubes 1, 2 and 3 are provided with similar grid circuits including the secondary windings 47, 46 and 45 respectively of grid transformers 50, 49 and 48. The arrangement is such that the phase of the alternating current grid voltage of each succeeding tube is opposite with respect to the alternating current grid voltage of the preceding tube and for this purpose the primary winding of each of the transformers 48, 49 and 50 is energized from a secondary winding on the preceding transformer. More particularly, the primary winding 51 of transformer 50 is connected to the secondary winding 52 of transformer 49, the primary winding 53 of transformer 49 is connected to a secondary winding 54 of transformer 48, and the primary winding 55 of transformer 48 is connected to a secondary winding 56 of the transformer 40.

The grid-condensers bridged by the leak resistances are charged through the grids of the tubes during the positive phase and are discharged through the leak resistances during the negative phase. Consequently, the grids of all the tubes are negative somewhat longer than they are positive so that all the grids are negative for a short time and short circuiting of the direct current supply E is prevented.

The system shown in Fig. 2, which embodies the present invention, comprises two circuit arrangements A and B which are similar to that illustrated in Figure 1, and a common "load resistance" 10, shown as the primary winding of a transformer having a secondary winding across which a load is connected.

The circuit arrangement A comprises two grid-controlled discharge tubes 15 and 16 connected in the same manner in series between the positive conductor 19 and terminals 23 of the "load resistance" 10, a condenser 11 connected across the series connection of tubes 15 and 16, and a condenser 12 connected across the series connection of tube 16 and "load resistance" 10. Similarly, the circuit arrangement B comprises two grid-controlled discharge tubes 17 and 18 connected in the same manner in series between the negative conductor 20 and terminal 23, a condenser 14 connected across the series connection of tubes 17 and 18, and a condenser 13 connected across the series connection of "load resistance" 10 and tube 17.

To control the conductivity of the discharge paths of tubes 15 to 18, a known arrangement may be provided, for instance as has been described in my copending U. S. patent application Ser. No. 245,514, and in connection with Figure 1.

Only one half the direct voltage E is applied to each of the circuit arrangements A and B and consequently the number of stages in each of the arrangements can be smaller by a factor 2 than the number of the stages in the prior art arrangement shown in Figure 1. On the other hand, the current passing through the "load resistance" 10 is twice that which passes through the "load resistance" 9 of Figure 1.

If the discharge paths of both of the odd-numbered tubes 15 and 17 are conductive and at the same time the discharge paths of both of the even-numbered tubes 16 and 18 are non-conductive, the charging current of condenser 12 as well as the discharge current of condenser 13 will pass through the "load resistance" 10. The path of the charging current of condenser 12 can be traced from the positive line 19 through tube 15, condenser 12 and "load resistance" 10 to ground, and path of the discharge current of condenser 13 can be traced from one terminal of condenser 13 through the "load resistance" 10 and tube 17. This current, which passes to the left through the "load resistance" 10, has twice the value of the current passed through "load resistance" 9 of Figure 1.

If, after a certain time interval, the discharge paths of the odd-numbered tubes 15 and 17 are blocked and at the same time the discharge paths of the even-numbered tubes 16 and 18 are made conductive, the discharge current of tube 12 as well as the charging current of condenser 13 flows to the right through the "load resistance" 10. The path of the discharge current of condenser 12 may be traced from condenser 12 through tube 16 and "load resistance" 10, and the path of the charging current of condenser 13 may be traced from ground through "load resistance" 10, condenser 13, and tube 18 to the negative conductor 20. Thus, the "load resistance" 10 must be capable of handling twice the current handled by the "load resistance" 9 of Fig. 1. On the other hand the power delivered to the load in Figure 2 is twice that delivered in Figure 1, while using the same supply voltage E.

In an arrangement such as shown in Figure 2, the producer of the high direct voltage must, of course, be provided with a zero point which is connected to terminal 23 or terminal 28. As shown, the high direct voltage E is produced by two generators 24 and 25 whose interconnection 27 is connected to terminal 23 by a conductor 26. In this case an alternating current of a value equal to one-half of the current passing through "load resistance" 10, flows through the ground. Instead of using conductor 26, terminal 23 and point 29 may, of course, be grounded.

If, instead of terminal 23, the terminal 28 of the "load resistance" 10 is connected to point 27, either through a conductor or ground, the current passing through "load resistance" 10 is reduced by half, but the charging potentials of condensers 12 and 13 are lost.

The condensers 5, 11 and 12 may be omitted without modifying the voltages, current strengths or the operation of the arrangements illustrated in Figures 1 and 2. However, if this were done, the device shown in Figure 2 would have the further advantage over the device of Figure 1 that one less condenser is used.

In the arrangement shown, the peak value of the alternating voltage obtained across the "load resistance" 10 is less than the voltage E by a factor 4. However, by using additional stages, this voltage can be further increased by factors of 6, 8, 10 etc.

I have shown a single-phase transformer as the "load resistance" but a multi-phase transformer, for instance a three-phase, may be used. In such a case, however, the "load resistance" 10 would in each instance, consist of one of the three primary windings whose star point would be grounded. This has been shown in Figure 3. By a corresponding phase displacement in the control of the discharge paths of the tubes, a three-phase current could be produced.

In Figure 3 conductor 19 has been connected through the circuits C, D and E with the point 23, so that three closed circuits are formed via conductor 26, terminal 27 and generator 24. Similarly three closed circuits are formed beginning at conductor 20, the circuits F, G and H, terminal 23, conductor 26, terminal 27, and generator 25. The windings 29, 30 and 31 are shown as to be the primary windings of a three phase transformer, which secondary windings output are numbered with 32, 33 and 34. The discharge tubes and the condensers shown in each of the circuits, CH, DG or EF are similarly connected in the circuits as described in Figure 2.

While I have described my invention in connection with specific applications and details of construction, I do not wish to be limited thereto because obvious modifications will present themselves to one skilled in the art.

What I claim is:

1. A device for converting a direct voltage of comparatively high value into an alternating voltage of lower value comprising two circuit arrangements each comprising a plurality of controlled discharge tubes connected in the same manner in a series connection, each connection having one end connected to one and the same end of a common "load resistance," and a condenser connected across each two succeeding tubes and a condenser connected across the series connection of said "load resistance" and the discharge tube connected thereto, the other ends of the series connections being connected to the direct voltage supply conductors, a connection between a point of said "load resistance" and a point of the direct current supply source said point having a potential between the potentials of the supply conductors, the arrangement being such, that the discharge tubes of both circuit arrangements are connected in the same manner in a series connection and means for controlling the conductivity of the discharge paths of said tubes in such a manner that periodically all the even-numbered tubes are made conductive, while at the same time all the odd-numbered tubes are made non-conductive and vice versa.

2. A device for converting a direct voltage of comparatively high value into an alternating voltage of lower value comprising two circuit arrangements each comprising the same number of controlled discharge tubes connected in the same manner in a series connection, each connection having one end connected to one and the same end of a common "load resistance," and a condenser connected across each two succeeding tubes and a condenser connected across the series connection of said "load resistance" and the adjacent discharge tube, the other ends of the series connections being connected to the direct voltage supply conductors, a connection between one end of said "load resistance" and a zero-point of the direct-voltage supply, the arrangement being such, that the discharge tubes of both circuit arrangements are connected in the same manner in a series connection and means to control the conductivity of the discharge paths of said tubes in such a manner, that periodically all the even numbered tubes are made conductive, while at the same time all the odd-numbered tubes are made non-conductive and vice versa.

3. A device for converting a direct voltage of comparatively high value into an alternating voltage of lower value, comprising two circuit arrangements each including a plurality of controlled discharge tubes connected in the same manner in a series connection having one end connected to one and the same end of a common "load resistance," a condenser connected across each two succeeding tubes and a condenser connected across the series connection of said "load resistance" and the discharge tube connected thereto, a controlled discharge tube connected between each of the other ends of the series connections and one of the direct voltage supply conductors, a connection between a point of said "load resistance" and a point of the direct current supply source, said point having a potential between the potentials of the supply conductors, the discharge tubes of both circuit arrangements being connected in the same manner in a series connection, and means for controlling the conductivity of the discharge paths of the tubes of the circuit arrangements in such a manner that periodically all the even-numbered tubes are made conductive while at the same time all the odd-numbered tubes are made nonconductive and vice versa.

4. A device for converting a direct voltage of comparatively high value into an alternating voltage of lower value, comprising a three-phase transformer having three primary windings each acting as a "load resistance," three circuit arrangements each comprising two circuits each including a plurality of controlled discharge tubes connected in the same manner in a series, each of the circuits of each arrangement having one end connected to one end of one of said primary windings and its other end connected to a direct voltage supply conductor, a condenser connected across each two succeeding tubes, and a condenser connected across the series connection of the primary winding and the discharge tube connected thereto, a connection between a point of said primary windings and a point of the direct current supply source, said latter point having a potential between the potentials of the supply conductors, the arrangement being such that the discharge tubes of both circuits of each arrangement are connected in the same manner in a series connection, and means for controlling the conductivity of the discharge paths of the tubes of said circuits in such a manner that periodically all the even-numbered tubes of each arrangement are made conductive while at the same time all the odd-numbered tubes are made non-conductive and vice versa and the control of tubes of the three arrangements has a mutual phase displacement of 120°.

5. A device for converting a direct voltage of comparatively high value into an alternating voltage of lower value, comprising a three-phase transformer having three primary windings each acting as a "load resistance," three circuit arrangements each comprising two circuits each including a plurality of controlled discharge tubes connected in the same manner in a series, each of the circuits of each arrangement having one end connected to one end of one of said primary windings and its other end connected to a direct voltage supply conductor, a controlled discharge tube in said latter connection, a condenser connected across each two succeeding tubes, and a condenser connected across the series connection of the primary winding and the discharge tube connected thereto, a connection between a point of said primary windings and a point of the direct current supply source, said latter point having a potential between the potentials of the supply conductors, the arrangement being such that the discharge tubes of both circuits of each arrangement are connected in the same manner in a series connection, and means for controlling the conductivity of the discharge paths of the tubes of said circuit in such a manner that periodically all the even-numbered tubes of each arrangement are made conductive while at the same time all the odd-numbered tubes are made non-conductive and vice versa and the control of the three arrangements have a mutual phase development of 120°.

ALBERT BOUWERS.